US009904670B2

(12) United States Patent
Kamada et al.

(10) Patent No.: US 9,904,670 B2
(45) Date of Patent: *Feb. 27, 2018

(54) APPARATUS AND METHOD FOR HELPING IN THE READING OF AN ELECTRONIC MESSAGE

(71) Applicant: International Business Machines Corporation, Armonk, NY (US)

(72) Inventors: Ryoju Kamada, Yokohama (JP); Ryo Kamimura, Yokohama (JP); Shingo Kato, Tokyo (JP); Takayuki Sato, Babson Park, MA (US)

(73) Assignee: International Business Machines Corporation, Armonk, NY (US)

( * ) Notice: Subject to any disclaimer, the term of this patent is extended or adjusted under 35 U.S.C. 154(b) by 845 days.

This patent is subject to a terminal disclaimer.

(21) Appl. No.: 14/013,404

(22) Filed: Aug. 29, 2013

(65) Prior Publication Data

US 2014/0379327 A1 Dec. 25, 2014

(51) Int. Cl.
*G06F 17/27* (2006.01)
*G06F 17/28* (2006.01)
(Continued)

(52) U.S. Cl.
CPC ........ *G06F 17/275* (2013.01); *G06F 17/2765* (2013.01); *G06F 17/2836* (2013.01);
(Continued)

(58) Field of Classification Search
CPC .............. G06F 17/275; G06F 17/2765; G06F 17/2836; G06F 17/30702
See application file for complete search history.

(56) References Cited

U.S. PATENT DOCUMENTS 4,412,305 A 10/1983 Yoshida
4,456,973 A 6/1984 Carlgren et al.
(Continued)

FOREIGN PATENT DOCUMENTS

JP H0784839 A 3/1995
JP 2000089882 3/2000
(Continued)

OTHER PUBLICATIONS

U.S. Appl. No. 12/254,163, Office Action dated Jan. 20, 2011.
(Continued)

*Primary Examiner* — William Bashore
*Assistant Examiner* — Nathan Shrewsbury
(74) *Attorney, Agent, or Firm* — Ryan Lewis; Hoffman Warnick LLC

(57) ABSTRACT

An apparatus and method for determining whether the meaning of a word included in an electronic message needs to be presented to a user, according to a dynamic determination whether the user currently knows the meaning of the word. In a client, a communication control unit receives a message sent between users, a morphological analysis unit extracts a word from the message, and a history acquisition unit acquires history information on viewing, usage, or the like of the word. A display determination unit determines whether the meaning of the word needs to be displayed, according to the acquired history information, the language level of a user stored in a user level storage unit, and the difficulty level of the word stored in a dictionary storage unit. An input/output control unit performs control such that the meaning of the word is presented to the user according to the determination result.

19 Claims, 15 Drawing Sheets

(51) Int. Cl.
*G06F 17/30* (2006.01)
*G06Q 10/10* (2012.01)
*H04L 12/58* (2006.01)

(52) U.S. Cl.
CPC ..... *G06F 17/30702* (2013.01); *G06Q 10/107* (2013.01); *H04L 51/04* (2013.01)

(56) References Cited

U.S. PATENT DOCUMENTS

| | | | |
|---|---|---|---|
| 4,481,607 A | 11/1984 | Kobayashi et al. | |
| 5,302,132 A | 4/1994 | Corder | |
| 5,387,104 A | 2/1995 | Corder | |
| 5,678,053 A | 10/1997 | Anderson | |
| 5,987,401 A | 11/1999 | Trudeau | |
| 6,085,162 A | 7/2000 | Cherny | |
| 6,961,722 B1 | 11/2005 | Bruecken | |
| 7,437,296 B2 | 10/2008 | Inoue et al. | |
| 2001/0029455 A1* | 10/2001 | Chin | G06F 17/273 704/277 |
| 2003/0220972 A1 | 11/2003 | Montet et al. | |
| 2004/0133417 A1 | 7/2004 | Azuma | |
| 2005/0240756 A1 | 10/2005 | Mayer | |
| 2006/0004680 A1 | 1/2006 | Robarts et al. | |
| 2006/0069558 A1 | 3/2006 | Beattie et al. | |
| 2006/0230350 A1 | 10/2006 | Baluja | |
| 2006/0277046 A1 | 12/2006 | Lachish et al. | |
| 2007/0061720 A1 | 3/2007 | Kriger | |
| 2007/0155434 A1 | 7/2007 | Jobs et al. | |
| 2007/0299911 A1 | 12/2007 | Mizunashi et al. | |
| 2008/0034288 A1 | 2/2008 | Landar et al. | |
| 2008/0059145 A1 | 3/2008 | Wood et al. | |
| 2008/0077397 A1 | 3/2008 | Shimohata | |
| 2008/0147801 A1 | 6/2008 | Foti | |
| 2009/0106695 A1 | 4/2009 | Perry et al. | |

FOREIGN PATENT DOCUMENTS

| | | |
|---|---|---|
| JP | 2004015142 | 1/2004 |
| JP | 2005293115 | 10/2005 |
| JP | 2006331258 A | 12/2006 |

OTHER PUBLICATIONS

U.S. Appl. No. 12/254,163, Office Action dated Jun. 1, 2011.
U.S. Appl. No. 12/254,163, Office Action dated Sep. 16, 2011.
U.S. Appl. No. 12/254,163, Office Action dated Mar. 2, 2012.
Mio Motomura, Information Materials for IDS, JPO Office Action dated Jul. 17, 2012.
U.S. Appl. No. 12/254,163, Office Action dated Oct. 16, 2012.
U.S. Appl. No. 12/254,163, Notice of Allowance and Fees Due dated May 24, 2013.

* cited by examiner

| WORD | MEANING | LEVEL |
|---|---|---|
| administrative scrivener | [名] 1. 行政書士 | B |
| certificate | [名] 1. 証明書、2. 免許書、… | C |
| certificated public accountant | [名] 1. 公認会計士 | B |
| gorgeous | [形] 1. 華麗な、豪華な、2. 素晴らしい、… | C |
| picturesque | [形] 絵のように美しい | A |
| secretary | [名] 1. 書記、秘書、2. 大臣、長官、… | C |
| show | [他動] 1. 見せる、2. 飾る、3. 案内する、… | D |
| sound | [自動] 1. 音を出す、2. ～に聞こえる、… | D |
| villa | [名] 1. 大邸宅、別荘、2. 郊外住宅、… | C |

(b)

| WORD | APPEARANCE DATE/TIME | USAGE DATE/TIME | FREQUENCY | DICTIONARY CONSULTATION DATE/TIME |
|---|---|---|---|---|
| administrative scrivener | 5/16 18:34 | | 1 | |
| certificate | ⋮<br>5/16 18:34 | | 6 | |
| gorgeous | | 5/16 18:35 | 1 | |
| picturesque | 5/16 18:32 | | 1 | |
| secretary | 5/16 18:32 | | 1 | |
| show | 5/16 18:34 | | 1 | |
| sound | | 5/16 18:33 | 1 | |
| villa | 5/16 18:32 | | 1 | |

APPARATUS AND METHOD FOR HELPING IN THE READING OF AN ELECTRONIC MESSAGE

CROSS-REFERENCE TO RELATED APPLICATIONS

This application is a continuation of U.S. patent application Ser. No. 12/254,163, which received a Notice of Allowance on May 24, 2013, and is incorporated herein by reference in its entirety.

TECHNICAL FIELD

The present invention relates to an apparatus and a method for helping in the reading of an electronic messages, in particular, electronic messages exchanged between multiple users.

BACKGROUND ART

International business has increased in recent years. Accordingly, opportunities to communicate with foreigners using foreign languages have also increased. For example, assume that two persons having different native languages have a chat via the Internet. If the two persons have different language levels, they may not be able to communicate with each other smoothly. In such a situation, one of the two persons who has a lower language level usually obtains a translation of a hard-to-understand word possibly included in a message sent from the other person by using an electronic dictionary or a translation site. However, it takes time and effort to do such work. Even if such work can be done with one click or can be done by simply positioning a mouse cursor over a hard-to-understand word, the complexity of the work becomes non-negligible if the frequency of translation is increased For this reason, technologies for automatically consulting a dictionary to examine the meanings of words have been proposed. According to a technology disclosed in Japanese Unexamined Patent Application Publication No. 2000-89882, if a sentence display window is selected, a sentence displayed in the window is divided into words, a dictionary is consulted to examine the meanings of only words corresponding to a given level among the divided words, and the dictionary-consulted words and their typical meanings are displayed at a glance in a meaning list display window.

Among technologies related to language learning are a system for allowing a user to learn a language with pleasure using a cell phone or the like according to the user's learning level (see, e.g., Japanese Unexamined Patent Application Publication No. 2004-151421) and a dictionary search apparatus in which history information on searched keywords accumulated for each user is secondarily used so that the history information is presented to each user (see, e.g., Japanese Unexamined Patent Application Publication No. 2005-293115).

However, in the technology disclosed in Japanese Unexamined Patent Application Publication No. 2000-89882, the language level used to determine whether a dictionary need be consulted is a static criterion. In general, the language level of a user with respect to a particular language varies with a lapse of time and the usage situation of the language. If a dictionary need be consulted is determined according to such a static criterion, the determination result may not match the user's current language level.

As for the technologies disclosed in Japanese Unexamined Patent Application Publication Nos. 2004-151421 and 2005-293115, neither can determine whether a dictionary need be consulted to examine the meaning of a word.

These problems occur not only when a user attempts to obtain a translation of a word in a language different from the user's native language but also when a user attempts to pronounce a hard-to-pronounce word or understand a hard-to-understand word in the user's native language.

SUMMARY OF THE INVENTION

Accordingly, the present invention determines if the meaning of a word included in an electronic message needs to be presented to a user, according to a dynamic determination of whether the user currently knows the meaning of the word.

The present invention provides an apparatus for helping in the reading of an electronic message exchanged between multiple users. The apparatus includes: an extraction unit for extracting a word from the electronic message sent to a particular user; an acquisition unit for acquiring history information on at least one of viewing and usage of the word by the particular user; and a determination unit for determining whether a meaning of the word extracted by the extraction unit needs to be presented to the particular user, according to the history information acquired by the acquisition unit.

Here, the acquisition unit may acquire the history information on the viewing of the word, and if the history information on the viewing of the word meets a criterion that is related to the viewing of the word and predetermined as a criterion for presuming that the particular user knows the meaning of the word, the determination unit may determine that the meaning of the word need not be presented to the particular user.

The acquisition unit may acquire the history information on the viewing of the word, and if the history information on the viewing of the word does not meet a criterion that is related to the viewing of the word and predetermined as a criterion for presuming that the particular user knows the meaning of the word, the determination unit may determine that the meaning of the word needs to be presented to the particular user.

The acquisition unit may acquire the history information on the viewing of the word and the history information on the usage of the word, and even if the history information on the viewing of the word does not meet a criterion that is related to the viewing of the word and predetermined as a criterion for presuming that the particular user knows the meaning of the word, the determination unit may determine that the meaning of the word need not be presented to the particular user if the history information on the usage of the word meets a criterion that is related to the usage of the word and predetermined as a criterion for presuming that the particular user knows the meaning of the word.

The acquisition unit may acquire the history information on the viewing of the word and the history information on the usage of the word, and if the history information on the viewing of the word does not meet a criterion that is related to the viewing of the word and predetermined as a criterion for presuming that the particular user knows the meaning of the word and if the history information on the usage of the word does not meet a criterion that is related to the usage of the word and predetermined as a criterion for presuming that the particular user knows the meaning of the word, the determination unit may determine that the meaning of the word needs to be presented to the particular user.

The acquisition unit may acquire the history information on the usage of the word, and if the history information on the usage of the word meets a criterion that is related to the usage of the word and predetermined as a criterion for presuming that the particular user knows the meaning of the word, the determination unit may determine that the meaning of the word need not be presented to the particular user.

The acquisition unit may acquire the history information on the usage of the word, and if the history information on the usage of the word does not meet a criterion that is related to the usage of the word and predetermined as a criterion for presuming that the particular user knows the meaning of the word, the determination unit may determine that the meaning of the word needs to be presented to the particular user.

The acquisition unit may acquire the history information on the usage of the word and the history information on consultation of an electronic dictionary performed by the particular user to examine the meaning of the word, and if the history information on the usage of the word does not meet a criterion that is related to the usage of the word and predetermined as a criterion for presuming that the particular user knows the meaning of the word and if the history information on the consultation does not meet a criterion that is related to the consultation and predetermined as a criterion for presuming that the particular user knows the meaning of the word, the determination unit may determine that the meaning of the word needs to be presented to the particular user.

The acquisition unit acquires the history information on the usage of the word and the history information on consultation of an electronic dictionary performed by the particular user to examine the meaning of the word, and even if the history information on the usage of the word does not meet a criterion that is related to the usage of the word and predetermined as a criterion for presuming that the particular user knows the meaning of the word, the determination unit may determine that the meaning of the word need not be presented to the particular user if the history information on the consultation meets a criterion that is related to the consultation and predetermined as a criterion for presuming that the particular user knows the meaning of the word.

The present invention also provides a method for helping in the reading of an electronic message exchanged between multiple users. The method includes: extracting a word from the electronic message sent to a particular user; acquiring history information on at least one of viewing and usage of the extracted word performed by the particular user; and determining whether a meaning of the extracted word needs to be presented to the particular user, according to the acquired history information.

Further, the present invention provides a program product for causing a computer to function as an apparatus for helping in the reading of an electronic message exchanged between multiple users. The program product, when executed by the computer, causes the computer to function as: an extraction unit for extracting a word from the electronic message sent to a particular user; an acquisition unit for acquiring history information on at least one of viewing and usage of the word by the particular user, the word being extracted by the extraction unit; and a determination unit for determining whether a meaning of the word extracted by the extraction unit needs to be presented to the particular user, according to the history information acquired by the acquisition unit.

According to the present invention, whether the meaning of a word included in an electronic message need be presented to a user is determined according to a dynamic determination whether the user currently knows the meaning of the word.

BRIEF DESCRIPTION OF THE DRAWINGS

FIG. 14(a) shows an example of content stored in a dictionary storage unit according to an embodiment of the present invention.

FIG. 14(b) shows an example of content stored in a history storage unit according to an embodiment of the present invention.

DETAILED DESCRIPTION OF THE INVENTION

Various embodiments of present invention will now be described with reference to the accompanying drawings.

First, a computer system to which an embodiment is applied will be described.

Figure 1:
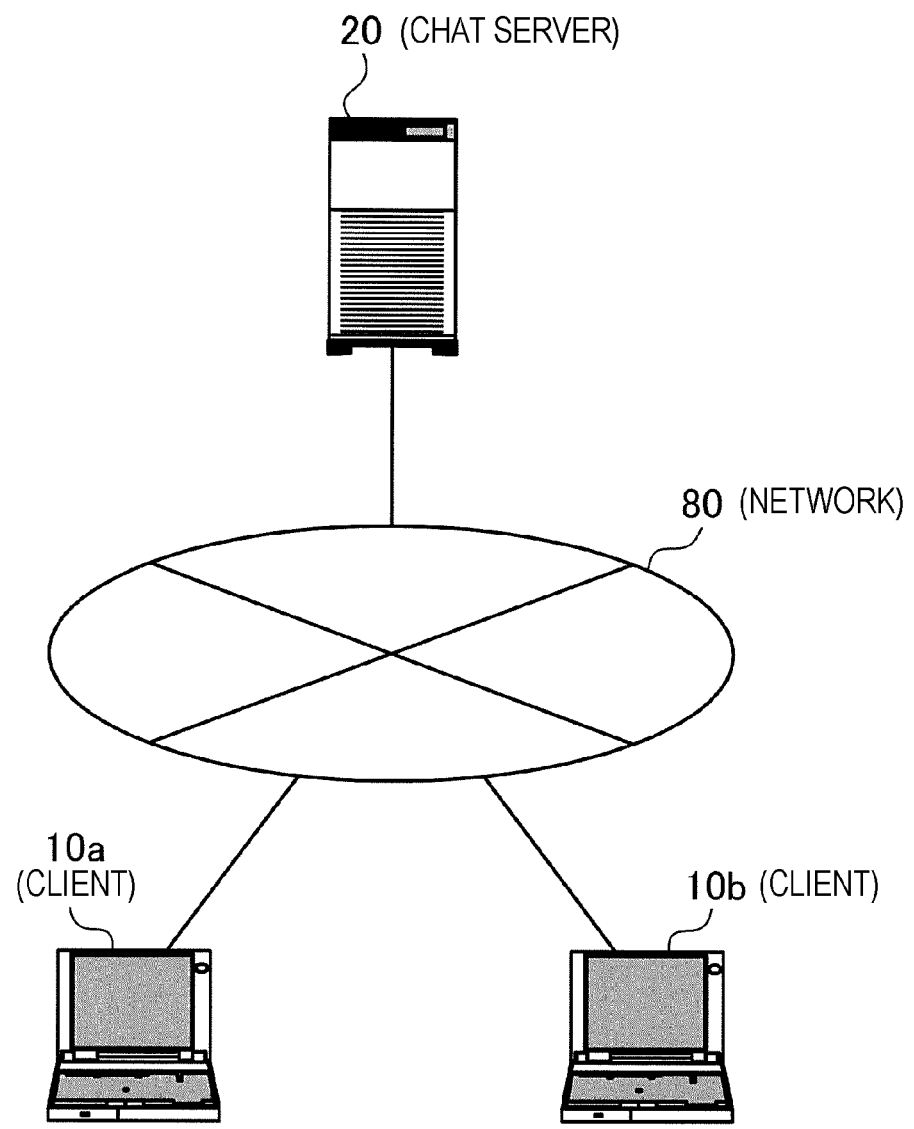
FIG. 1 is a diagram showing an example overall configuration of a computer system according to an embodiment of the present invention.

FIG. 1 is a diagram showing an example overall configuration of such a computer system.

As shown, a client 10*a*, a client 10*b*, and a chat server 20 are coupled to one another via a network 80 in this computer system.

The clients 10a and 10b are terminals used by users, such as personal computers (PCs). More specifically, the clients 10a and 10b are terminals that users use to exchange electronic messages (hereafter simply referred to as "messages") with each other. While only two clients are shown in the drawing, three or more clients may be provided. In the following description, the clients 10a and 10b may be simply referred to as "clients 10" unless these clients need be distinguished.

The chat server 20 is a server computer for managing exchange of messages in a chat performed via the network 80. For example, according to a request to participate in a chat from the client 10a used by a user A and a request to participate in the same chat from the client 10b used by a user B, the chat server 20 manages identification information on the chat, identification information on the user A, identification information on the user B, identification information on the client 10a, and identification information on the client 10b, and the like. If the chat server 20 receives a message from the user A or user B, it performs control such that the message is sent to the client 10 used by the other user.

The network 80 is a communication means used to exchange messages. Examples of the network 80 include the Internet and local area networks (LANs).

In the computer system having such a configuration, a translation display program according to an embodiment is installed into each client 10. This translation display program automatically translates words included in a message received from the client 10 used by a chat partner so that the meanings of the words are displayed. At that time, it is determined whether the meaning of each word included in the message needs to be displayed, according to history information on a plurality of items (e.g., appearance date, appearance frequency, usage experience, and whether or not a dictionary has been consulted) as well as the level of each word. If it is determined that the meaning of any word needs to be displayed, the meaning of the word is displayed in a manner that the word is colored with a color corresponding to its level.

The functions realized in the client 10 by executing this translation display program will be described below.

Figure 2:
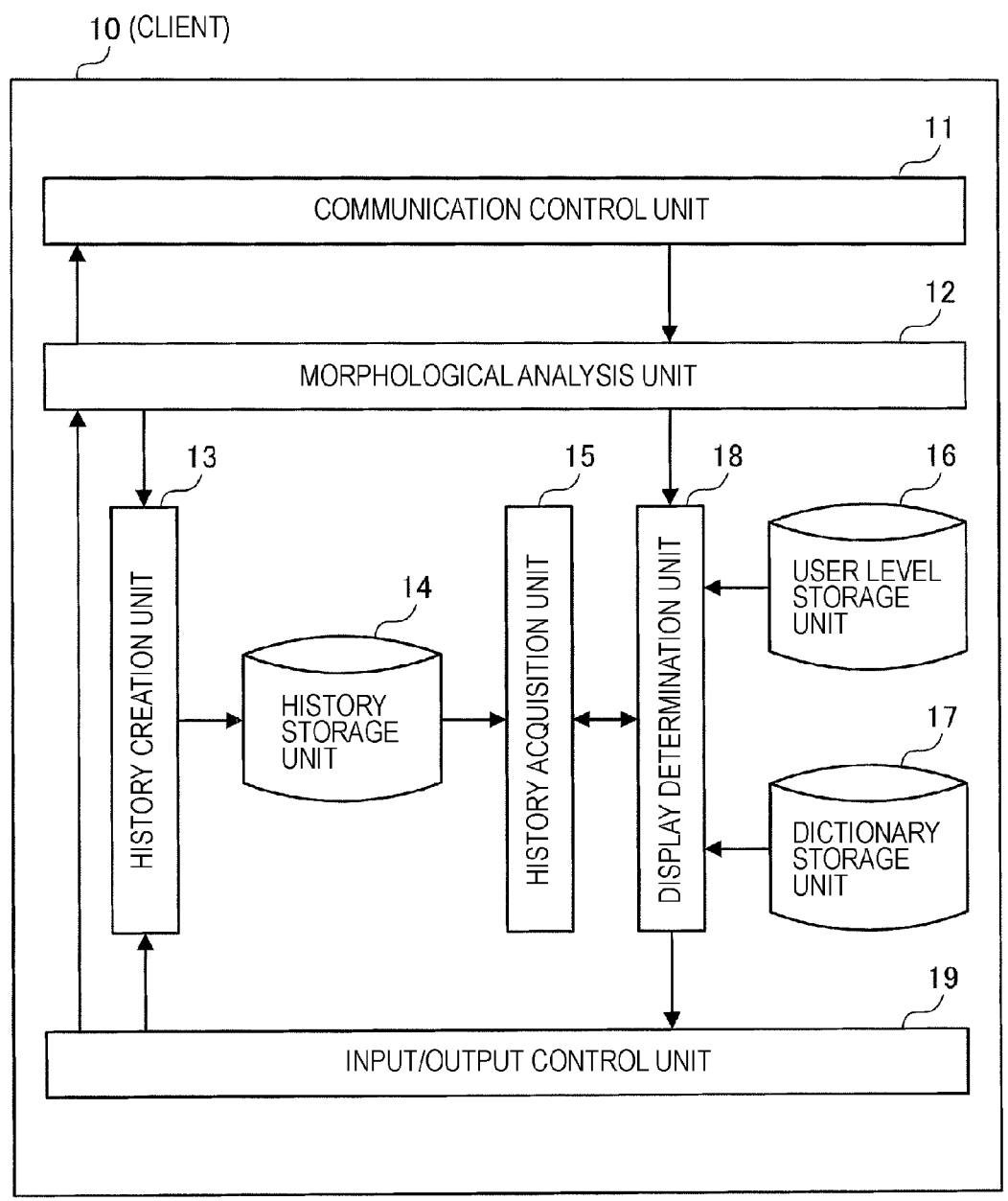
FIG. 2 is a block diagram showing an example functional configuration of a client according to an embodiment of the present invention.

FIG. 2 is a block diagram showing an example functional configuration of the client 10.

As shown, the client 10 includes a communication control unit 11, a morphological analysis unit 12, a history creation unit 13, a history storage unit 14, and a history acquisition unit 15. It also includes a user level storage unit 16, a dictionary storage unit 17, a display determination unit 18, and an input/output control unit 19. In the following description, it will be assumed that the client 10 is used by the user B who receives messages from the user A as a chat partner and that the user A has a language ability higher than the user B.

The communication control unit 11 sends or receives messages to or from the chat server 20 via the network 80.

The morphological analysis unit 12 divides a message described in a natural language into a string of morphemes and determines the part of speech of each morpheme. A "morpheme" here refers to the smallest unit having a meaning in a natural language. For example, if a message to be processed is "She showed a certificate of administrative scrivener," "She (PRON)/showed (V)/ a (DET)/ certificate (N)/ of (PREP)/ administrative scrivener" will result. Here, "/" denotes a dividing position of the message and "PRON," "V," "DET," "N," and "PREP" denote a pronoun, a verb, an indefinite article, a noun, and a preposition, respectively. The morphological analysis is a known technology and will not be described in detail. In an embodiment, the morphological analysis unit 12 is provided as an example of an extraction unit for extracting a word from an electronic message.

The history creation unit 13 creates history information on the viewing, usage, and dictionary consultation by the user B, of words included in messages received or sent by the communication control unit 11, and stores these items of information in the history storage unit 14.

The history storage unit 14 stores the history information created by the history creation unit 13. While the history information according to an embodiment includes information on the date and time when the user B has viewed and/or used each word and information on the date and time when the user B has consulted an electronic dictionary to examine the meaning of each word, the history information may include other types of information.

The history acquisition unit 15 receives words with respect to each of which it will be determined whether the meaning need be displayed, from the display determination unit 18 and then acquires history information on these words. In an embodiment, the history acquisition unit 15 is provided as an example of an acquisition unit for acquiring history information.

The user level storage unit 16 stores the user level representing the language ability of each user. For example, if the target foreign language is English, the level of a user may be set to any of five levels representing the English ability according to the user's TOEIC (registered trademark) score.

The dictionary storage unit 17 stores a dictionary in which each word is associated with meanings corresponding to parts of speech of the word. According to an embodiment, each word is given a word level representing the difficulty of the word in this dictionary. For example, the level of a word may be set to any of five levels representing the difficulty of a word, like the user level. While the word level is considered additional information to the electronic dictionary in an embodiment, the correspondence between each word and its word level may be stored independently of the electronic dictionary.

The display determination unit 18 determines whether the meaning of a word need be displayed, according to the history information stored in the history storage unit 14, the user level stored in the user level storage unit 16, and the word level stored in the dictionary storage unit 17. In an embodiment, the display determination unit 18 is provided as an example of a determination unit for determining whether the meaning of a word need be displayed.

The input/output control unit 19 displays the meaning of a word on the display of the client 10 or receives an operation performed on the client 10 using a mouse or the like.

Also assume that an application (not shown) for realizing instant messaging and an application (not shown) for realizing an automatic dictionary consultation function are also installed in the client 10. The "instant messaging" here refers to a system in which users are allowed to perform chatting, file transfer, or the like with each other if they are using the same software on the Internet and are online. The "automatic dictionary consultation function" here refers to a function for allowing the meaning of a word to be displayed when the word is pointed to with a mouse.

Operations of the client 10 according to an embodiment will now be described.

Figure 3:
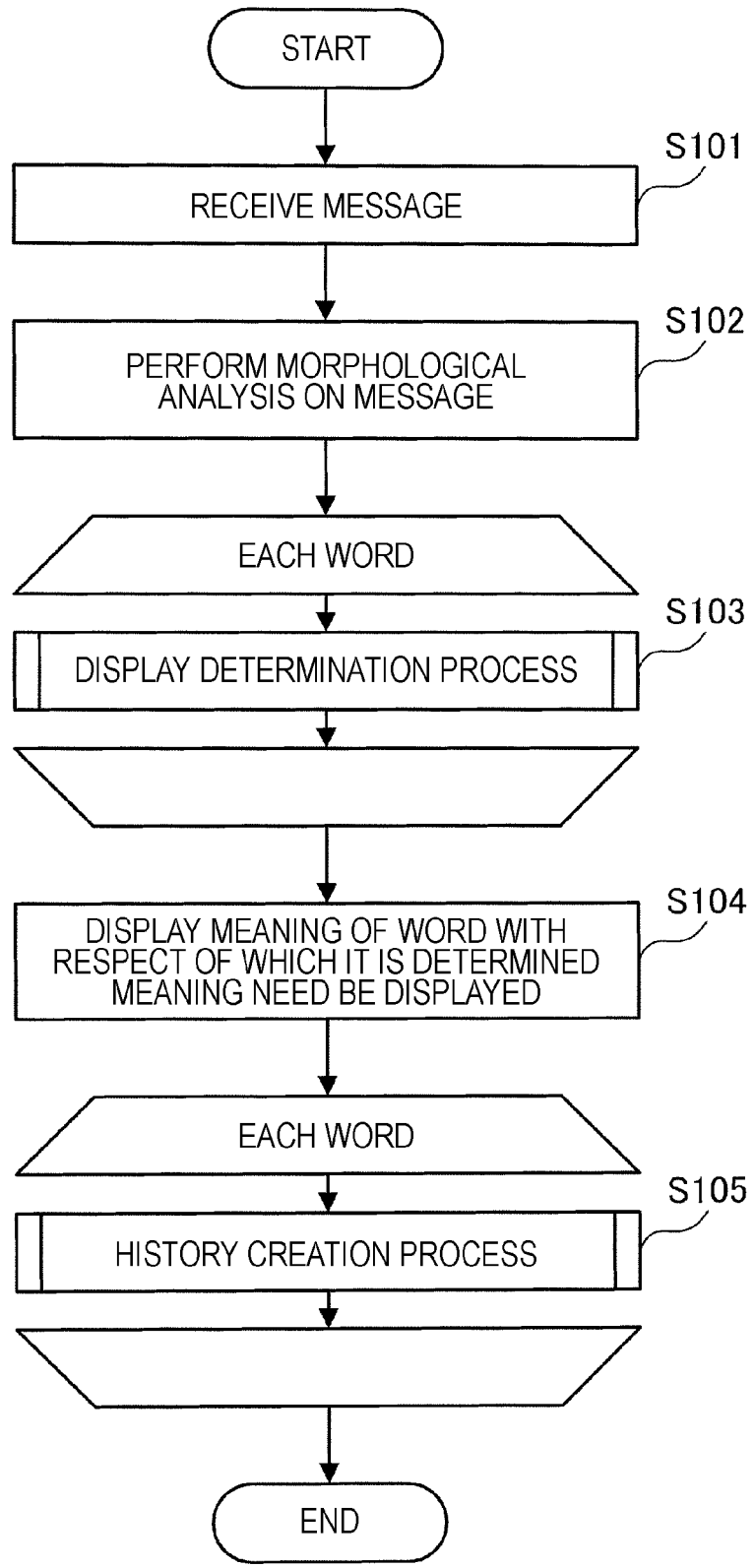
FIG. 3 is a flowchart showing example operations of the client according to an embodiment of the present invention.

First, operations performed by the client 10 when it receives a message sent from the user A will be described. FIG. 3 is a flowchart showing one example of such operations.

In the client 10, first, the communication control unit 11 receives a message from the user A and passes it on to the morphological analysis unit 12 (step 101). Then, the morphological analysis unit 12 performs a morphological analysis on the passed message and passes the analysis result on to the display determination unit 19 and history creation unit 13 (step 102). Specifically, the morphological analysis unit 12 passes information on multiple words and their parts of speech obtained as a result of the morphological analysis, on to the display determination unit 18. Also, the morphological analysis unit 12 passes information on the multiple words as a result of the morphological analysis, information on the user A as the sender, and information on the date and time when the message has been received, on to the history creation unit 13.

Subsequently, the display determination unit 18 performs a display determination process of determining whether the meaning of each word needs to be displayed and passes the determination result on to the input/output control unit 19 (step 103). At that time, the display determination unit 18 instructs the history acquisition unit 15 to acquire history information on each word from the history storage unit 14. Then, the display determination unit 18 refers to the history information acquired by the history acquisition unit 15 from the history storage unit 15. It also refers to the user level of the user B stored in the user level storage unit 16 and the word level of each word stored in the dictionary storage unit 17.

Thereafter, the input/output control unit 19 displays not only the passed multiple words but also the meanings of several words with respect to each of which it has been determined that the meaning need be displayed (step 104). At that time, the several words are displayed in a manner that the words are colored according to their respective word levels. With regard to the meanings of these words, only meanings corresponding to their parts of speech in the message are displayed separately from the message. The meanings of words with respect to each of which it has been determined that the meaning need not be displayed and the meanings corresponding to other parts of speech of the words, the meanings of which are displayed, are displayed if the user points to these words with a mouse.

On the other hand, the history creation unit 13 performs a history creation process of creating history information for each word and stores the created history information in the history storage unit 14 (step 105). At that time, the history creation unit 13 takes into account information on the sender passed from the morphological analysis unit 12, information on the date and time when the message has been received, and information on the dictionary consultation passed from the input/output control unit 19.

Figure 4:
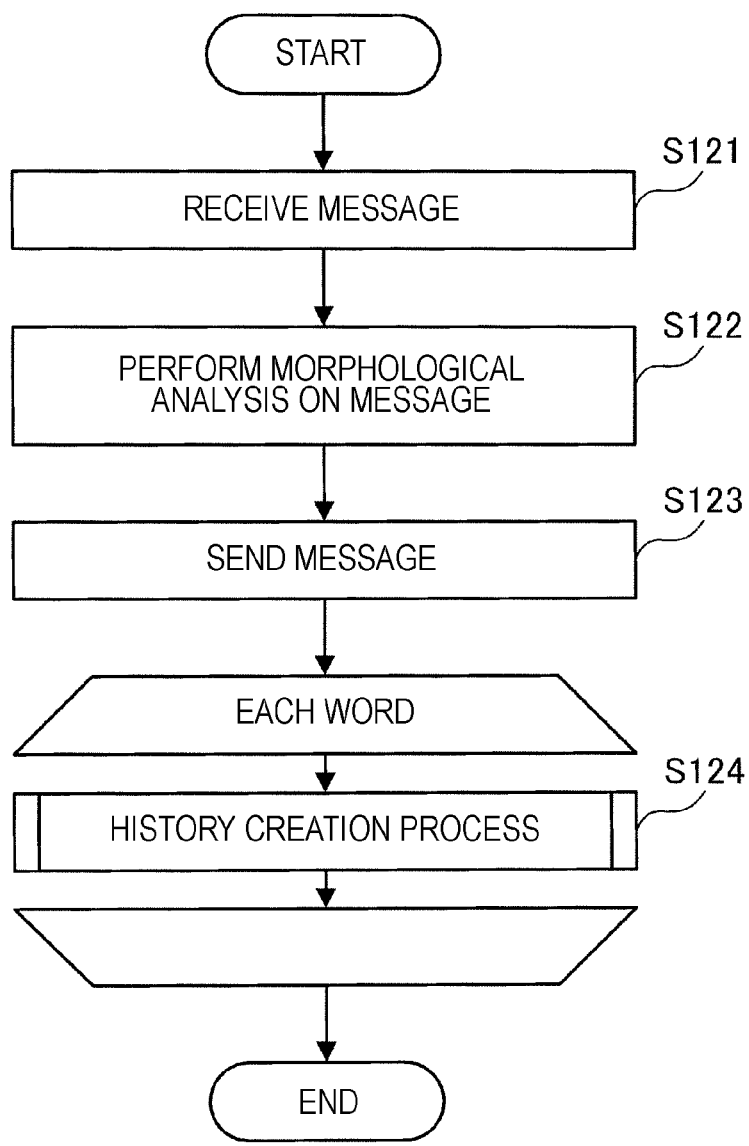
FIG. 4 is a flowchart showing example operations of the client according to an embodiment of the present invention.

Operations performed when a message inputted by the user B is sent will now be described. FIG. 4 is a flowchart showing an example of such operations.

In the client 10, first, the input/output control unit 19 receives a message from the user B and passes it on to the morphological analysis unit 12 (step 121). Then, the morphological analysis unit 12 performs a morphological analysis on the passed message and passes the analysis result on to the history creation unit 12, as well as passes the message on to the communication control unit 11 (step 122). Specifically, the morphological analysis unit 12 passes multiple words obtained as a result of the morphological analysis, information on the user B as the sender of the message, and information on the date and time when the message has been received, on to the history creation unit 13.

Upon receipt of the message from the morphological analysis unit 12, the communication control unit 11 sends the message to the chat server 20 via the network 80 (step 123).

On the other hand, the history creation unit 13 performs a history creation process of creating history information for each of the passed words and stores the created history information in the history storage unit 14 (step 124). At that time, the history creation unit 13 takes into account information on the sender of the message passed from the morphological analysis unit 12 and information on the date and time when the message has been received.

Hereafter, the display determination process performed in step 103 shown in FIG. 3 will be described in detail.

Figure 5:
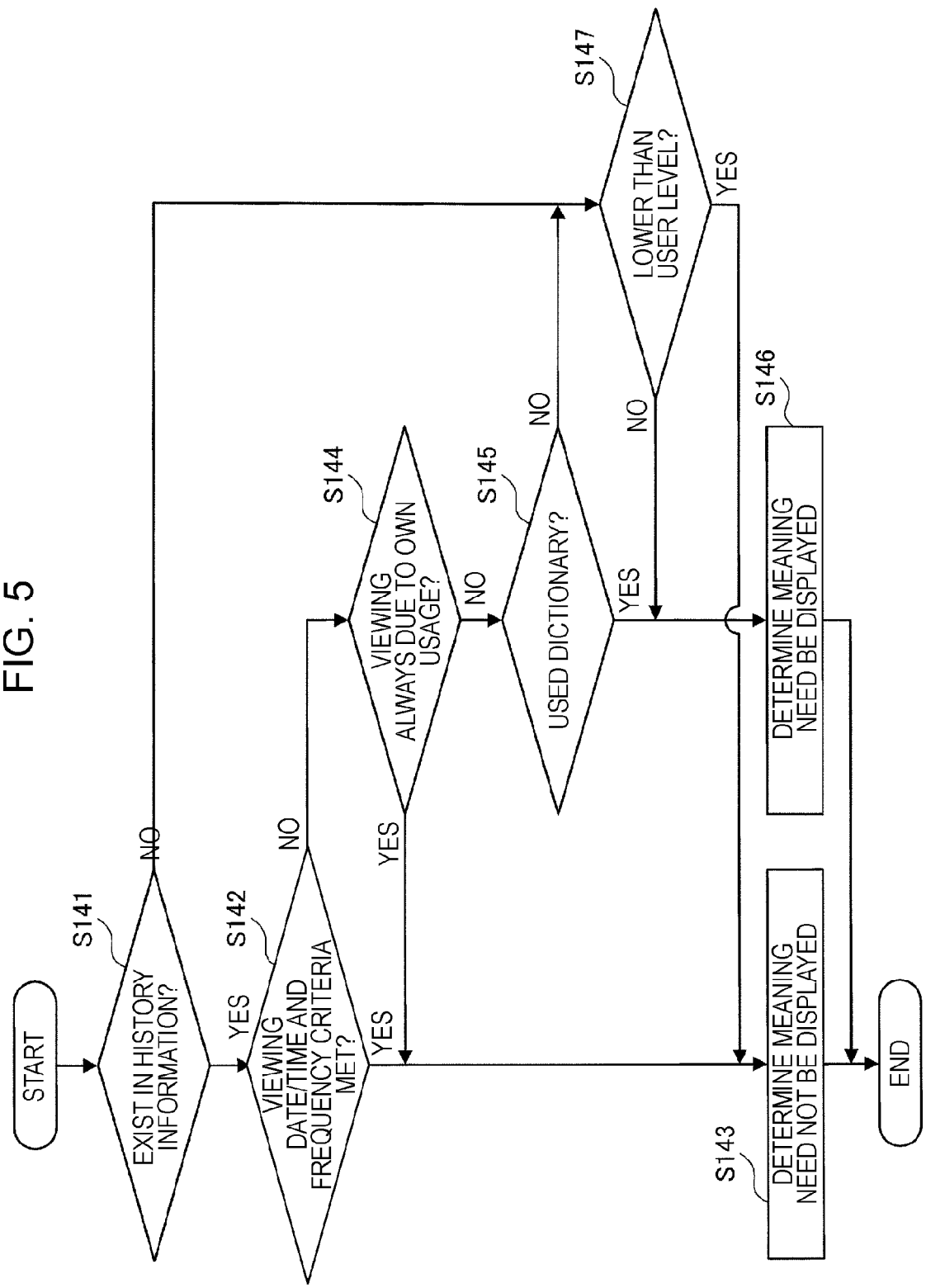
FIG. 5 is a flowchart showing example operations of a display determination unit according to an embodiment of the present invention.

FIG. 5 is a flowchart showing example operations of the display determination process. Note that these example operations are operations performed with respect to one of the multiple words passed from the morphological analysis unit 12.

When the operations are started, the display determination unit 18 first determines whether there is history information on that word (step 141). Specifically, the display determination unit 18 instructs the history acquisition unit 15 to acquire the history information on the word. Then, it makes the above-described determination according to a response from the history acquisition unit 15 indicating whether the history acquisition unit 15 has acquired the history information.

If the display determination unit 18 determines that there is the history information on the word, it refers to the history information to determine whether the user B has viewed the word within a predetermined time period or whether the user B has viewed it predetermined times or more (step 142). Here, it is assumed that the "viewing" is a concept including both a case where the user B has viewed a certain word because it has appeared in a message from the user A and a case where the user B has viewed the word because the user B has used it in a message of his or her own. If the user B has viewed the word within the predetermined time period or has viewed it at least a predetermined times, the display determination unit 18 adds, to the word, information indicating that the meaning of the word will not be displayed (step 143).

Displaying the meaning with respect to only words that have not been viewed within the predetermined time period, as described above, is based on a theory that a human is highly likely to forget a word that he or she has not viewed for some time. This theory is based on, for example, Ebbinghaus's forgetting curve indicating that a human loses 56% of his or her memory one hour after, its 74% one day after, and its 77% one week after.

Also, refraining from displaying the meaning of a word that has been viewed predetermined times or more is based on an idea that if a human has often viewed a certain word in messages, he or she is highly likely to bear the word in memory. In this case, the predetermined times may be set to, for example, six times according to "Increase Your Vocabulary with Seven Tips" (tentative English title), Newsweek Japan Edition, Apr. 25, 2007.

If the display determination unit 18 determines in step 142 that the user B has not viewed the word within the predetermined time period and has not viewed the word at least a predetermined number of times, it determines whether the viewing of the word has always been due to the usage of the word by the user B (step 144). Specifically, the display determination unit 18 makes the above-described determination by referring to information on the usage of the word by the user B included in the history information acquired by the history acquisition unit 15.

If the display determination unit 18 determines that the viewing of the word has always been due to the usage of the word by the user B, it adds, to the word, information indicating that the meaning of the word will not be displayed (step 143). This is based on an idea that a user who has used a certain word on his or her own is highly likely to know the word.

Conversely, if the display determination unit 18 determines that the viewing of the word has not always been due to the usage of the word by the user B, it determines whether the user B has consulted an electronic dictionary to examine the meaning of the word (step 145). The electronic dictionary here refers to dictionary data used to display the meaning of a word in a message sent by the user A by locating a mouse cursor on the word in the message on the display area.

If the display determination unit 18 determines that the user B has consulted the electronic dictionary, it retrieves the meaning of the word in the dictionary storage unit 17 and adds the retrieved meaning to the word (step 146). This is because if a user examines the meaning of a word using an electronic dictionary, he or she is highly likely to have forgotten the meaning of the word.

Conversely, if the display determination unit 18 determines that the user B has not used an electronic dictionary, it determines whether the meaning of the word need be displayed, according to a comparison between the user level and the word level. Specifically, the display determination unit 18 determines whether the word level is lower than the user level (step 147). If the word level is not lower than the user level, the display determination unit 18 retrieves the meaning of the word in the dictionary storage unit 17, and adds the retrieved meaning to the word (step 146). Conversely, if the word level is lower than the user level, the display determination unit 18 adds, to the word, information indicating that the meaning of the word will not be displayed (step 143).

Incidentally, if it is determined in step 141 that there is no history information on the word, the word is a word that has appeared for the first time in messages sent by the user A and messages inputted by the user B. Therefore, the display determination unit 18 determines whether the meaning of the word needs to be displayed, according to a comparison between the user level and word level. Specifically, the display determination unit 18 determines whether the word level is lower than the user level (step 147). If the word level is not lower than the user level, the display determination unit 18 retrieves the meaning of the word in the dictionary storage unit 17, and adds the retrieved meaning to the word (step 146). Conversely, if the word level is lower than the user level, the display determination unit 18 adds, to the word, information indicating that the meaning of the word will not be displayed (step 143).

Such operations performed in the display determination process are only illustrative and specific criteria for determining whether a user bears a word in memory are not limited to what are used herein.

For example, a criterion of whether the word has been viewed within the predetermined time period and a criterion of whether the word has been viewed predetermined times or more are used in step 142 as criteria related to the viewing of the word; however, these criteria are one example of criteria that are related to the viewing of the word and predetermined as criteria for presuming that the user B knows the meaning of the word.

Also, a criterion of whether the viewing of the word has always been due to the usage of the word by the user B is used as a criterion related to the usage of the word in step 144; however, this criterion is one example of a criterion that is related to the usage of the word and predetermined as a criterion for presuming that the user B knows the meaning of the word.

Further, a criterion of whether an electronic dictionary has not been consulted is used as a criterion related to the consultation in step 145; however, this criterion is one example of a criterion that is related to the consultation and predetermined as a criterion for presuming that the user B knows the meaning of the word.

Furthermore, all the determinations (determinations made in steps 142, 144, and 145) whether the user bears the word in memory need not be made.

For example, only the determination in step 142 may be made without making the determinations in steps 144 and 145. Or only the determinations in step 142 and 144 may be made without making the determination in step 145. Or only the determinations in step 144 and 145 may be made without making the determination in step 142. Or another process flow in which only one or two of the three determinations are made may be employed.

Figure 6:
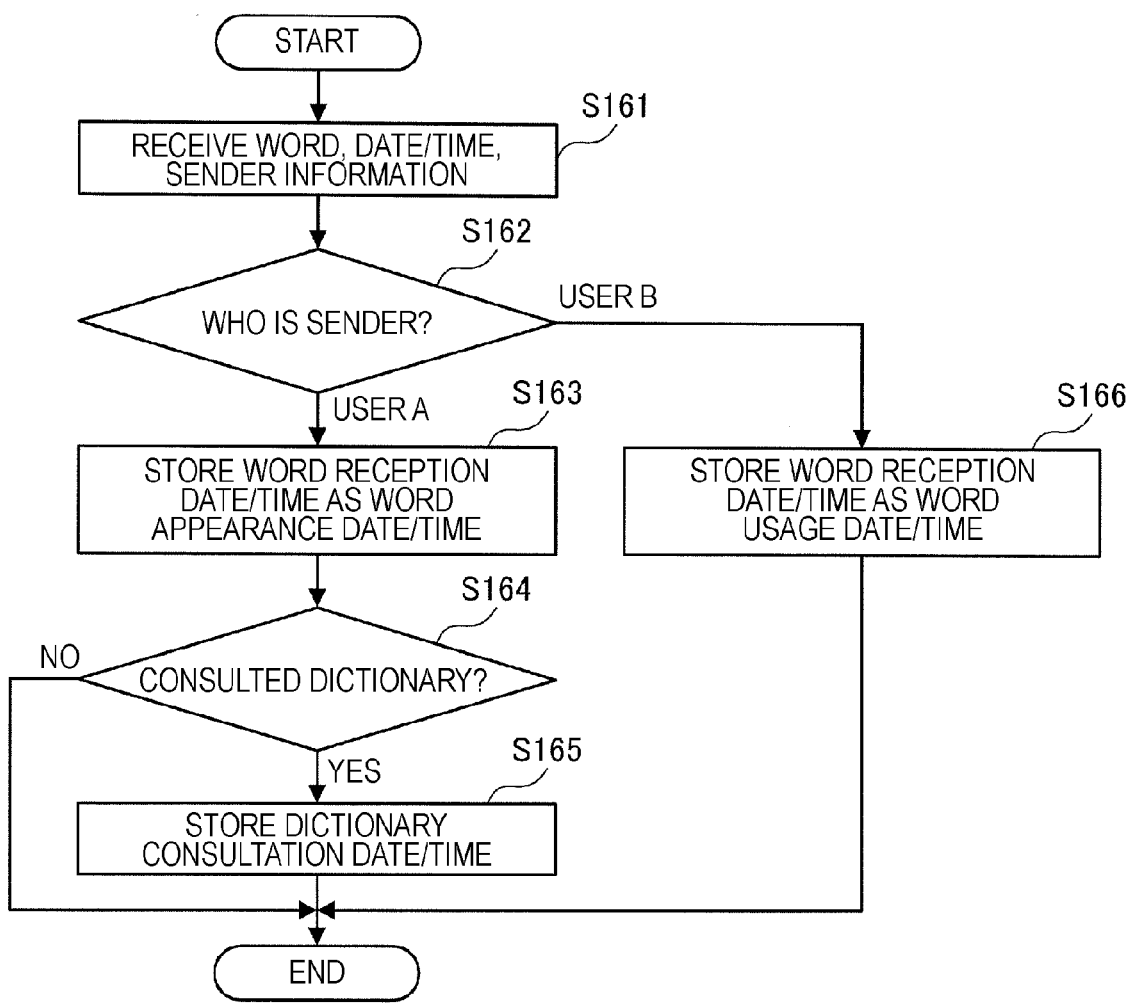
FIG. 6 is a flowchart showing example operations of a history creation unit according to an embodiment of the present invention.

The history creation process performed in step 105 of FIG. 3 and step 124 of FIG. 4 will now be described in detail. FIG. 6 is a flowchart showing example operations in the history creation process. These example operations are operations performed with respect to one of the multiple words passed from the morphological analysis unit 12.

When the operations are started, the history creation unit 13 receives, from the morphological analysis unit 12, that word, sender information indicating whether the word is included in a message sent by the user A or included in a message inputted by the user B, and the date and time when the word has been received by the communication control unit 11 or by the input/output control unit 19 (step 161). Then, the history creation unit 13 determines whether the sender information indicates the user A or it indicates the user B (step 162).

If the history creation unit 13 determines that the sender information indicates the user A, it stores the fact that the word has appeared in the message sent by the user A at the date and time when the word has been received, as history information (step 163) in the history storage unit 14. Thereafter, the word is displayed on the display or the like of the client 10 with its meaning or without its meaning, according to the result of the display determination process shown in FIG. 5. Thus, if the word is displayed without its meaning, the user B consults the electronic dictionary to examine the meaning of the word, as necessary.

Subsequently, the history creation unit 13 determines whether the electronic dictionary has been consulted for the word (step 164). If the history creation unit 13 determines that the electronic dictionary has been consulted, it stores the fact in the history storage unit 14 in a manner that the fact is associated with the word (step 165). Conversely, if the history creation unit 13 determines that the electronic dictionary has not been consulted, it stores no more information in the history storage unit 14.

On the other hand, if the history creation unit 13 determines that the sender information indicates the user B, it stores the fact that the user B has used the word at the date and time when the word has been received, as history information (step 166).

The operations according to an embodiment will now be described with regard to FIG. 7 using a window of the software "Sametime" manufactured by the IBM ("IBM" and "Sametime" are registered trademarks of the International Business Machines Corporation) as an example.

Figure 7:
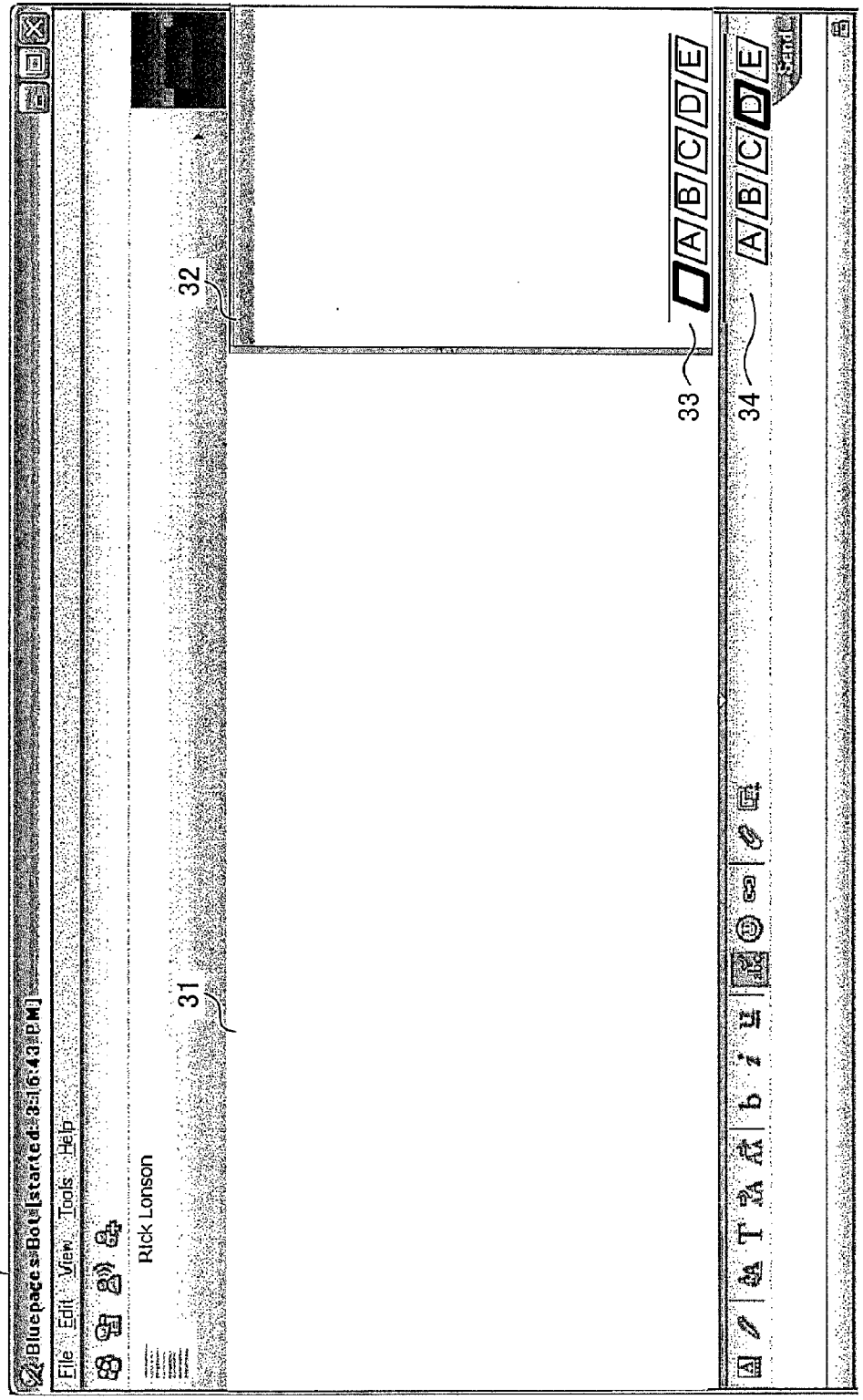
FIG. 7 is a drawing showing an example of a chat window used in an embodiment of the present invention.

FIG. 7 is a drawing showing a chat window 30 displayed in an embodiment.

The central area of the chat window 30 is divided into the left area and right area. The left area is used as a message history area 31. Most of the right area is used as a meaning display area 32. Level-specific display command buttons 33 are displayed in a lower part of the right area.

Among these, the message history area 31 is an area for displaying the history of messages exchanged in a chat.

Components of each message are displayed with colors according to their respective levels. Each component corresponds to any of five levels and the five levels are referred to as A, B, C, D, and E in decreasing order of difficulty. In an embodiment, the levels A, B, C, D, and E are assigned blue, green, yellow, orange, and red, respectively. Therefore, the components are displayed with these colors.

The components of a message include words and collocations. A collocation is a string of two or more words and has a specific meaning as a word does. Specifically, collocations include compound words (two or more words has a meaning by being combined without being connected directly or using a hyphen, as a word has a meaning), idioms, and phrases. In the message history area 31, collocations are underlined so that it is made clear that the collocations are combinations of two or more words. Note that if "words" are simply mentioned in this specification, the words also include collocations.

Also, the message history area 31 has a function of, if a message in a displayed history is selected, displaying the meanings of the components of the message in the meaning display area 32.

The meaning display area 32 is an area for displaying the meanings of components of a predetermined message. In the meaning display area 32, for example, the headings of the meanings of components are displayed with colors according to the components' respective levels like in the message history area 31. As described above, the levels A, B, C, D, and E are assigned blue, green, yellow, orange, and red, respectively, in an embodiment. Therefore, the headings of the meanings are displayed in these colors.

The meanings of components displayed in the meaning display area 32 are only the meanings of the components as their parts of speech in the message. However, by selecting any component, the meanings of the component as other parts of speech, and the like are also displayed in detail.

The level-specific display command buttons 33 are buttons for specifying the level of components whose meanings a user wants to display. Since components that have appeared in a message are recorded in a manner that each component is given the corresponding level, the meanings are displayed on a level-by-level basis by specifying the level using these buttons. Incidentally, a button that is located in the most left hand side in the drawing and on which no characters such as A to E are described is a button for requesting the display of the meanings of words regardless of any level. When this button is depressed, the meanings of components of the latest message from the chat partner are displayed unless a specific message is selected. If a specific message is selected, the meanings of components of the selected message are displayed. In the drawing, buttons on which A to E are described are buttons for specifying the level of components whose meanings will be displayed. If a button indicating a certain level is depressed, the meanings of components corresponding to the level in multiple messages from the chat partner are displayed. When any button is depressed, the frame of the button is displayed with a heavy line. Also, the buttons indicating the levels A to E may be colored with the above-described level-specific colors so that the levels specified by the buttons are easily grasped.

User level setting buttons 34 are also provided in a lower part of the chat window 30.

The user level setting buttons 34 are buttons for setting the level (user level) of the language ability of a user who has a chat using the chat window 30. For example, it is preferable to set a previously registered user level as the default in a manner that a button corresponding to the user level is highlighted and to change the user level by depressing any of the user level buttons 34 if necessary after a chat has been started. As with the level-specific display command buttons, when any of these buttons is depressed, the frame of the button is displayed with a heavy line. Also in this case, the buttons indicating the levels A to E may be colored with the above-described level-specific colors so that the user easily grasps his or her own level setting.

Assuming that a chat is actually being performed, specific display content will be described. Also in this case, assume that the user A is a user who is a chat partner and the user B is a user who is having a chat while watching the chat window 30, as described above. Also, assume that if the user B has viewed a certain word within twelve hours or has viewed it six times or more, it is presumed that the user B bears the word in memory. Further, assume that characters described with heavy lines in the drawings are colored in an actual window.

Figure 8:
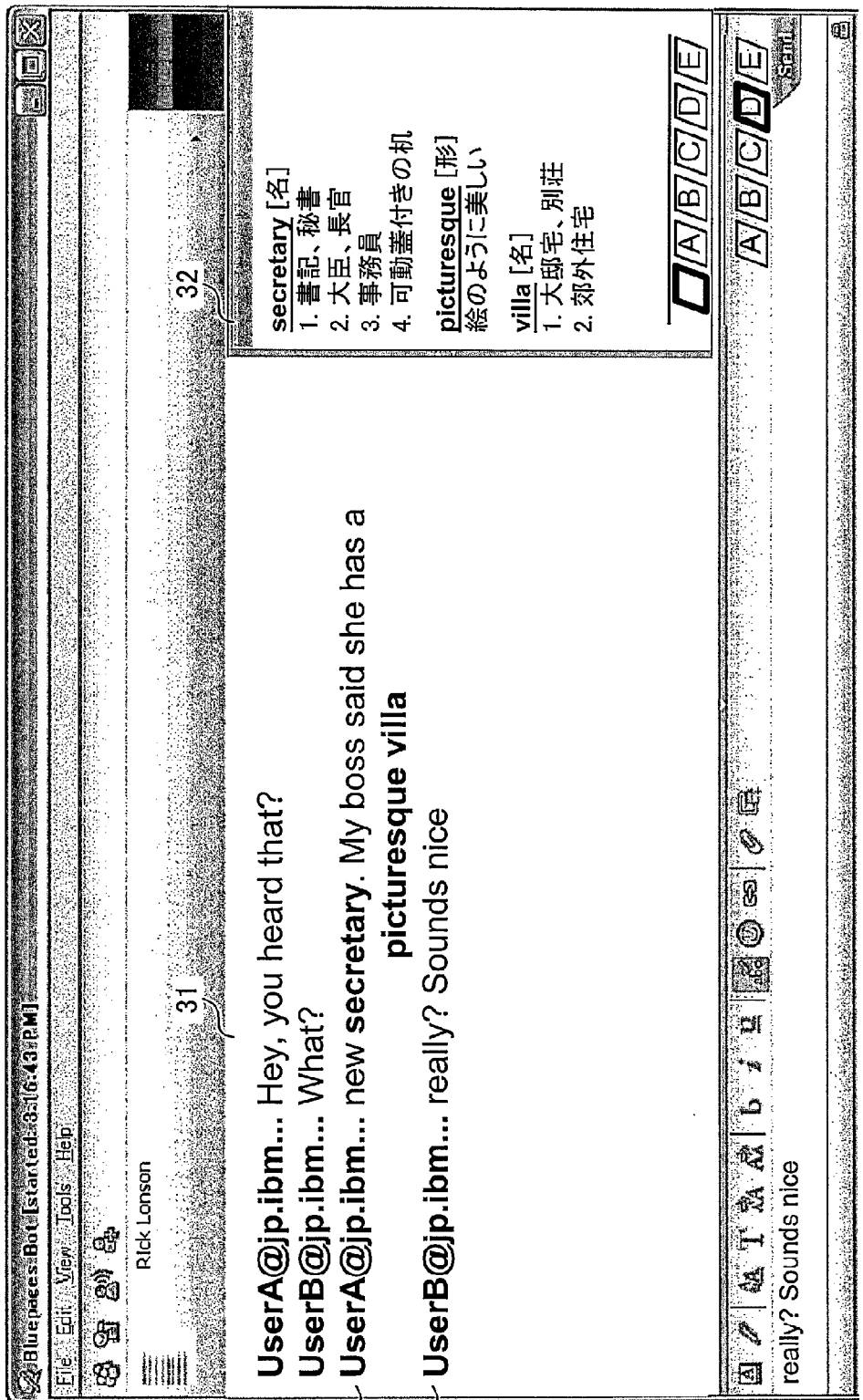
FIG. 8 is a drawing showing an example of a chat for describing a display determination process according to an embodiment of the present invention.

FIG. 8 shows the content displayed when the user B has sent a message 302 in response to a message 301 that is the second message from the user A after the start of a chat. Here, assume that the user B has had a chat several times until then, most of words that have appeared in this example are ones that have appeared for the first time, and only "certificate" has appeared five times in the chats until then.

Also, assume that the respective word levels of "secretary," "picturesque," and "villa" in the message 301 are higher than the user level and have appeared for the first time. Therefore, the meanings corresponding to the parts of speech of these words in the message are displayed in the meaning display area 32. If "secretary," "picturesque," and "villa" are a level C word, a level A word, and a level C word, respectively, they are displayed in yellow, blue, and yellow, respectively, in the message history area 31 and meaning display area 32.

Figure 9:
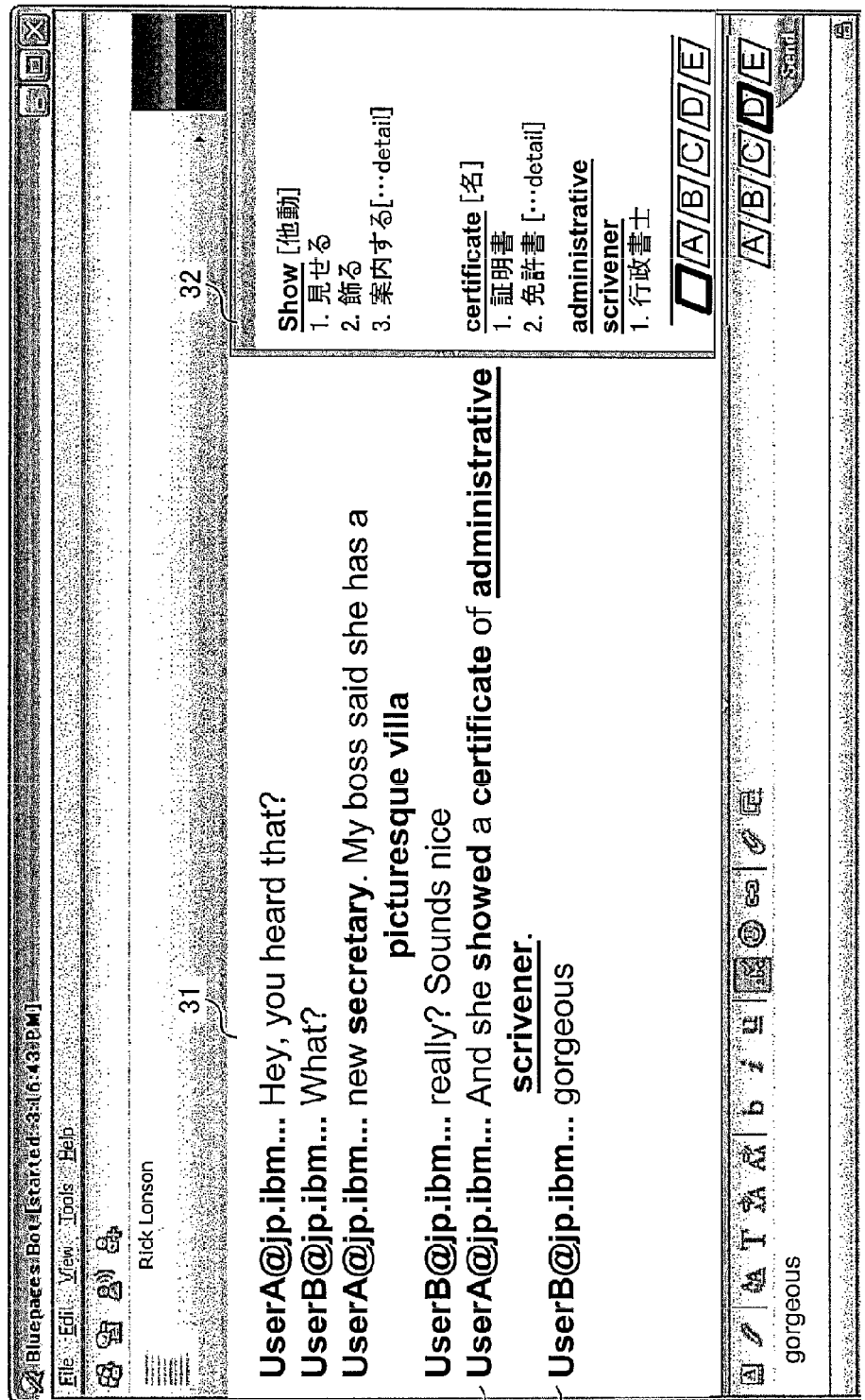
FIG. 9 a drawing showing an example of a chat for describing the display determination process according to an embodiment of the present invention.

FIG. 9 shows the content displayed when the user B has sent a message 312 in response to a message 311 that is the third message from the user A sent after that.

Here, assume that the respective word levels of "showed," "certificate," and "administrative scrivener" in the message 311 are higher than the user level and the respective appearance frequencies of these words have not reached six times. Therefore, the meanings corresponding to the parts of speech of these words in the message are displayed in the meaning display area 32. If "showed," "certificate," and "administrative scrivener" are a level D word, a level C word, and a level B word, respectively, they are displayed in orange, yellow, and green, respectively, in the message history area 31 and meaning display area 32.

Assume that a series of interactions in the chat shown in FIGS. 8 and 9 have been completed and, the day after, (e.g., twelve hours after), a chat about the same topic has been started again. Also, assume that the user B has had no chat during this time interval.

Figure 10:
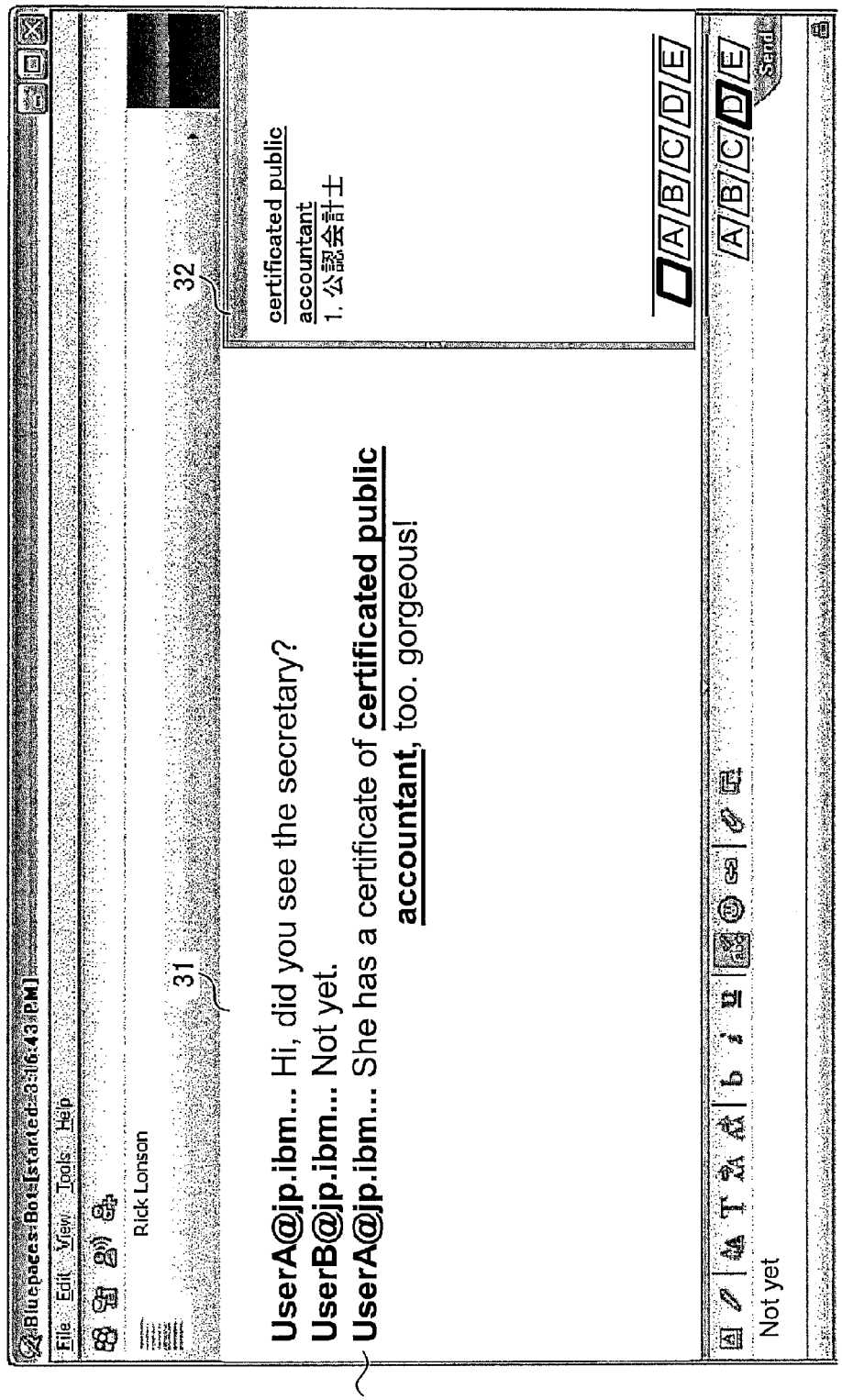
FIG. 10 a drawing showing an example of a chat for describing the display determination process according to an embodiment of the present invention.

FIG. 10 shows the content displayed when a message 321 that is the second message from the user A sent after the start of the chat about the same topic has been received.

Here, assume that the word level of "certificate" in the message 321 is higher than the user level as described with reference to FIG. 9 and the respective word levels of "certificated public accountant" and "gorgeous" in the same message are also higher than the user level. However, with regard to "certificate," its viewing frequency has reached six times because the user B has viewed it in the message 311 shown in FIG. 9. Therefore, its meaning is not displayed in the meaning display area 32. On the other hand, "gorgeous" has not been viewed within twelve hours and has not been viewed six times or more. However, it has been used by the user B in the message 312 shown in FIG. 9; therefore, its meaning is not displayed in the meaning display area 32. In the end, only "certificated public accountant" has not been viewed within twelve hours and has not been viewed six times or more. Also, it has not been used by the user B. Therefore, its meaning is displayed in the meaning display area 32. "If "certificated public accountant" is a level D word, it is displayed in green in the message history area 31 and meaning display area 32.

Hereafter, other display functions performed on the chat window 30 will be described.

First, a detailed meaning display function will be described.

In FIG. 9 referred to above, the part of speech of "show" in the message is a transitive verb; therefore, only the meaning of the word as a transitive verb is displayed. However, there is a description of "detail" in FIG. 9; therefore, the detailed meanings of "show" are displayed by clicking on this description.

Figure 11:
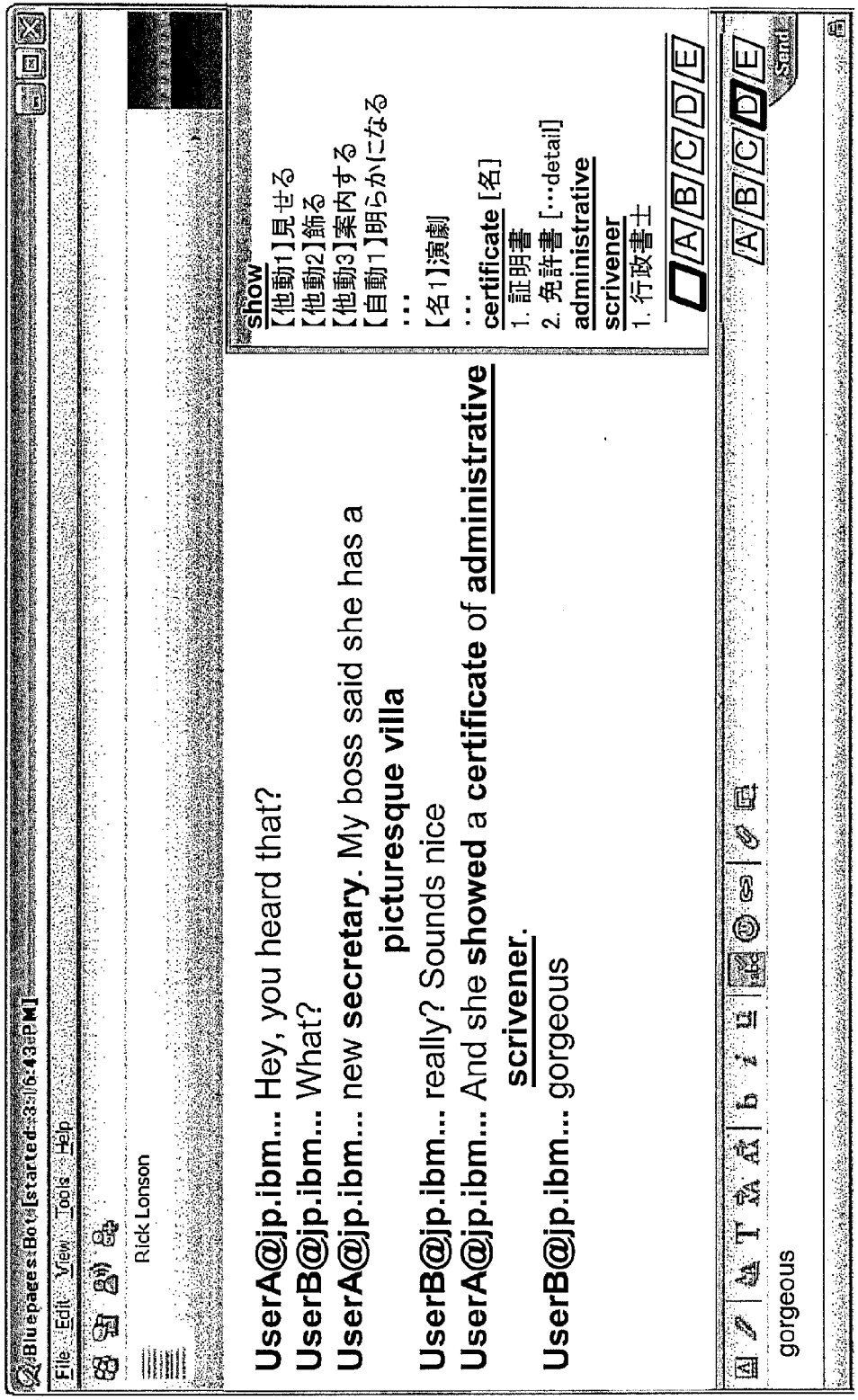
FIG. 11 is a drawing showing an additional function of the chat window used in an embodiment of the present invention.

FIG. 11 shows the content displayed at that time. Not only the meaning of "show" as a transitive verb but also the meanings thereof as an intransitive verb and a noun are displayed in the drawing.

Second, a level-specific meaning display function will be described.

In FIG. 9 referred to above, the most left one of the level-specific display command buttons 33 is selected. Thus, the meanings of components of the latest message sent by the user A are displayed unless any past message is selected. If an attempt is made to perform this level-specific meaning display function, a button on which any of A to E is described, among the level-specific display command buttons 33, is selected.

Figure 12:
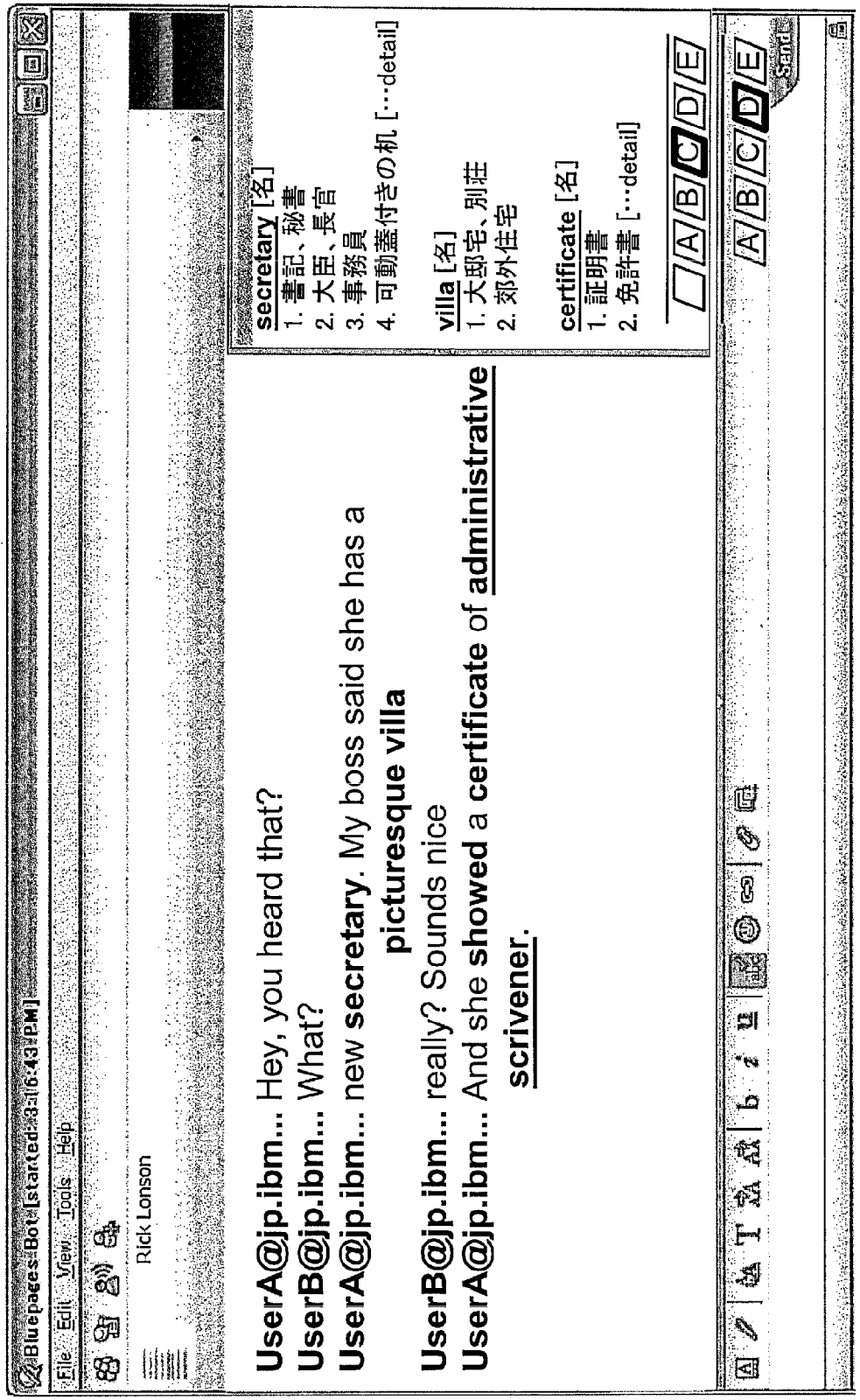
FIG. 12 is a drawing showing an additional function of the chat window used in an embodiment of the present invention.

FIG. 12 shows the content displayed at that time. Here, a button corresponding to the level C is selected as an example. In this case, the meanings of components corresponding to the level C, among the respective components of the messages displayed in the message history area 31, are displayed in the meaning display area 32. Specifically, "secretary," "villa," and "certificate" correspond to the level C, so the meanings thereof are displayed. At that time, the headings of the meanings of these components in the meaning display area 32 are displayed in yellow that is a color corresponding to the level C.

Third, a past message meaning display function will be described.

In FIG. 9 referred to above, an operation in which a past message is selected is not performed. Therefore, the meanings of the components of the latest message sent by the chat partner are displayed. On the other hand, if this past message meaning display function is performed, the meanings of components of a selected past message are displayed.

Figure 13:
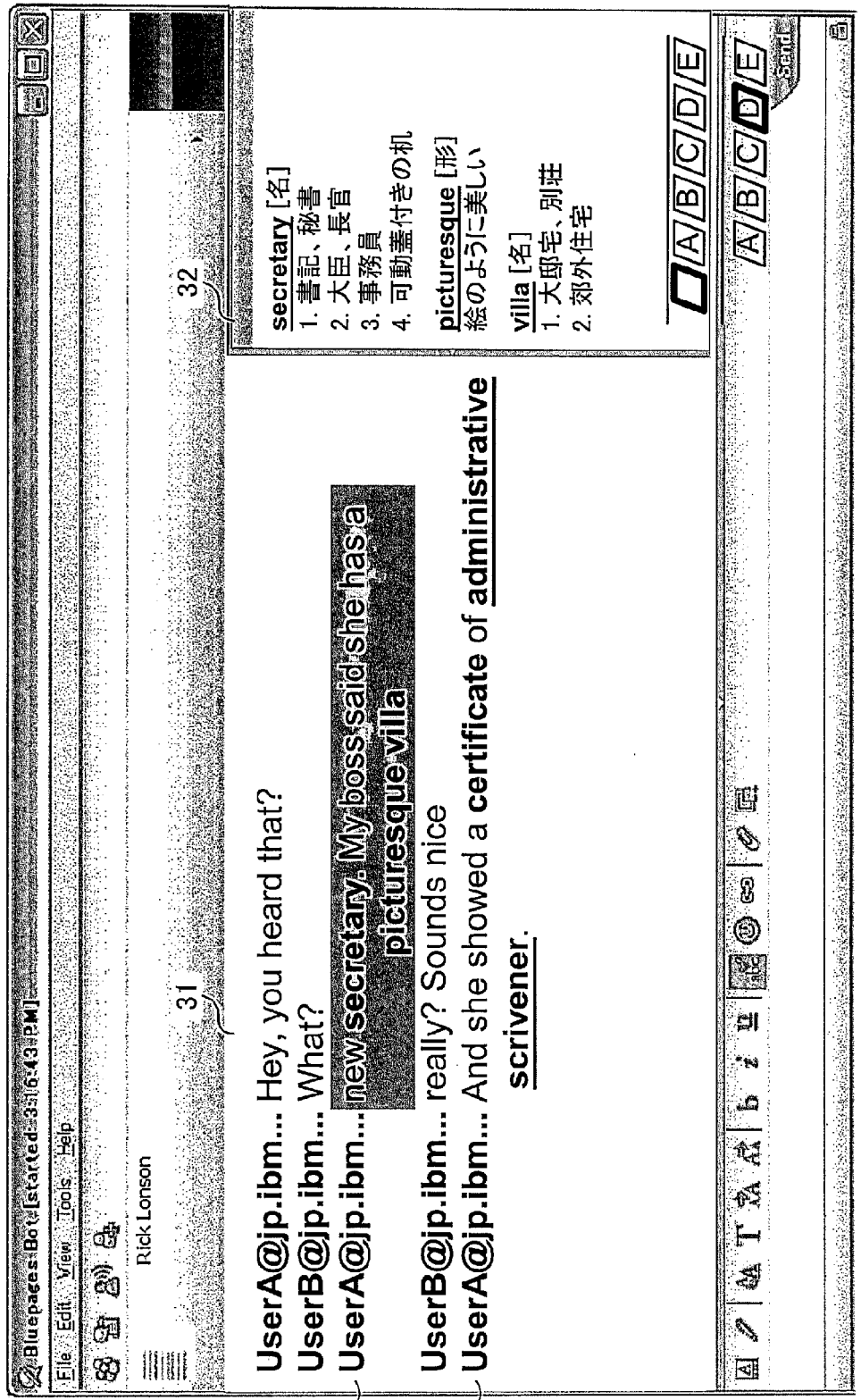
FIG. 13 is a drawing showing an additional function of the chat window used in an embodiment of the present invention.

FIG. 13 shows the content displayed at that time. This drawing shows the state immediately after the user A has sent the message 311. While the latest message sent by the user A is the message 311, the message 301 is selected in the drawing. A gray, rectangular area covering the message 301 indicates that the message 301 is selected. Thus, the meanings of components of the selected message 301 are displayed in the meaning display area 32. The displayed specific content is similar to what is shown in FIG. 8 and will not be described in detail.

Hereafter, an example of the content stored in the dictionary storage unit 17 according to an embodiment and the content stored in the history storage unit 14 according to an embodiment will now be described using the specific examples shown in FIGS. 8 to 13. If the flowchart shown in FIG. 5 is followed, the meaning of a word, whose word level is lower than the user level, will not be displayed in the meaning display area 32 unless all the following conditions are met: the user B has not viewed the word within a predetermined time period; the user B has not viewed it predetermined times or more; the user B has not used it on his or her own; and the user B has consulted the electronic dictionary. Also, an operation in which the dictionary is consulted is not performed in the examples shown in FIGS. 8 to 13. Therefore, in order to make the description simpler, words corresponding to levels lower than the user level are excluded from the content stored in the dictionary storage unit 17 and the content stored in the history storage unit 14. Specifically, since the user level is D, words corresponding to the level E are excluded.

FIG. 14(*a*) shows an example of the content stored in the dictionary storage unit 17. Here, the dictionary storage unit 17 stores the meanings and levels of the words corresponding to the levels equal to or higher than the level D that have appeared in FIGS. 8 to 13. These words are listed not in the order of appearance in FIGS. 8 to 13 but in the alphabetical order.

FIG. 14(*b*) shows an example of history information stored in the history storage unit 14.

As shown, the history information is information in which an appearance date/time, a usage date/time, a frequency, and a dictionary consultation date/time are associated with one another. Among these, the appearance date/time refers to the date and time when a target word has appeared in a message from the chat partner. The usage date/time refers to the date and time when a target word has been used in a message of the user's own. The frequency refers to the frequency with which a target word has appeared in messages from the chat partner and messages of the user's own. That is, the frequency is the sum of the number of the appearance dates/times recorded with respect to the word and the number of the usage dates/times recorded with respect to the word. While the frequency field is provided herein so that the frequency with which a specified word has appeared in the past messages is quickly acquired, the frequency may be counted using the information on the appearance date/time and the information on the usage date/time as necessary without providing the frequency field. The dictionary consultation date/time refers to the date and time when the meaning of a word that has appeared in a message from the chat partner has been examined by putting a mouse cursor on the word. Also in this case, the words are listed not in the order of appearance in FIGS. 8 to 13 but in alphabetical order.

Incidentally, the history information shown in FIG. 14(b) is history information at the time when a series of interactions in the chat shown in FIGS. 8 and 9 have been completed.

For example, assume that the message 301 shown in FIG. 8 has been received from the user A at 18:32, 05/16. Thus, "18:32, 05/16" is recorded in the history information as the respective appearance dates/times of "secretary," "picturesque," and "villa." The recording of the history information on the "secretary" among these words will be described using the flowchart shown in FIG. 6. First, "secretary," "18:32, 05/16," and "user A" are acquired in step 161. Next, it is determined in step 162 that the sender is the "user A"; therefore, in step 3, "secretary" is recorded in the word field of the history information, and "18:32, 05/16" in the corresponding appearance date/time field. Since the dictionary is not consulted in this example, step 165 is skipped and the process is completed. The same goes for "picturesque" and "villa."

Also, assume that the user B has sent the message 302 at 18:33, 05/16 in response to the message 301. Thus, "18:33, 05/16" is recorded in the history information as the usage date/time of "sound." The recording of the history information on the "sound" will be described below using the flowchart shown in FIG. 6. First, "sound," "18:33, 05/16," and "user B" are acquired in step 161. Next, it is determined in step 162 that the sender is the "user B"; therefore, "sound" is recorded in the word field of the history information, and "18:33, 05/16" in the corresponding usage date/time field.

Next, assume that the message 311 shown in FIG. 9 has been received from the user A at 18:34, 05/16. Thus, "18:34, 05/16" is recorded in the history information as the respective appearance dates/times of "show," "certificate," and "administrative scrivener." The process of recording the history information on each of these words performed at this time is similar to what is described above using "secretary" as an example and will not be described. Note that dots in the appearance date/time field of the "certificate" indicate that the "certificate" has appeared before 18:34, 05/16.

Also, assume that the user B has sent the message 312 at 18:35, 05/16 in response to the message 311. Thus, "18:35, 05/16" is recorded in the history information as the usage date/time of "gorgeous." The process of recording the history information on this word performed at this time is similar to what is described above using "sound" as an example and will not be described.

Also, assume that, subsequently, the message 321 shown in FIG. 10 has been received from the user A. In this case, the frequency of viewing of "certificate" by the user B has reached six times; therefore, the meaning thereof is not displayed this time. The process of determining whether the meaning of the "certificate" need be displayed will be described below using the flowchart shown in FIG. 5. First, it is determined in step 141 that "certificate" exists in the history information. Next, it is determined in step 142 that the viewing frequency of "certificate" is six times or more. Thus, it is determined in step 143 that the meaning of "certificate" need not be displayed.

The "certificated public accountant" is a word that the user B has viewed for the first time and its word level is higher than the user level; therefore, its meaning is displayed. The process of determining whether the meaning of the "certificated public accountant" need be displayed will be described below using the flowchart shown in FIG. 5. First, it is determined in step 141 that "certificated public accountant" does not exit in the history information. Next, it is determined in step 147 that the word level of "certificated public accountant" is higher than the user level. Thus, it is determined in step 146 that the meaning of "certificated public accountant" need be displayed.

As for "gorgeous," it has been viewed by the user B once and it has been viewed twelve or more hours before; however, it has been used by the user B. Therefore, the meaning of "gorgeous" is not displayed this time. The process of determining whether the meaning of the "gorgeous" need be displayed will be described below using the flowchart shown in FIG. 5. First, it is determined in step 141 that "gorgeous" exists in the history information. Next, it is determined in step 142 that "gorgeous" has not been viewed within twelve hours and it has not been viewed six times or more. Then, it is determined in step 144 that "gorgeous" has been used by the user B himself or herself. Thus, it is determined in step 143 that the meaning of "gorgeous" need not be displayed.

In an embodiment, the processes of creating history information on the viewing of a word, the usage thereof, and the dictionary consultation with respect to the word and the process of determining whether the meaning of the word need be displayed are all performed by the client 10. However, all or a part of these processes may be performed by the chat server 20. In this case, when a message sent from the user A to the user B passes through the chat server 20, the chat server 20 may perform all or a part of the above-described processes. If the electronic dictionary of the client 10 is used, the history information on the dictionary consultation is preferably transmitted from the client 10 to the chat server 20 without delay. Also, if a translation site is used, a message for consulting a dictionary may be passed through the chat server 20 so that the char server 20 acquires the history information on the dictionary consultation in real time.

Also, in an embodiment, assuming that two persons having different native languages are having a chat, the translations of words are displayed as the meanings of the words. However, this embodiment is also applicable to a case where users having the same native language exchange messages with each other. Specifically, if a hard-to-pronounce word or a hard-to-understand word is included in a message sent by the user A, it is determined whether the pronunciation or meaning of such a word need be displayed, according to history information.

As described above, the current language level of a user is dynamically determined in an embodiment taking into account not only static criteria but also histories including the usage situation of words. Thus, the meanings of words are optimally displayed in accordance with the dynamically determined user's language level.

Since an embodiment copes with changes in language level due to learning or a lapse of time as described above, it is continuously usable, thereby achieving high practical utility.

Also in an embodiment, when the meaning of a word is displayed, the meaning of the word as the part of speech in a message is displayed and the word is colored with a color corresponding to the level of the word. As a result, only necessary information is displayed in an easy-to-see manner.

Figure 15:
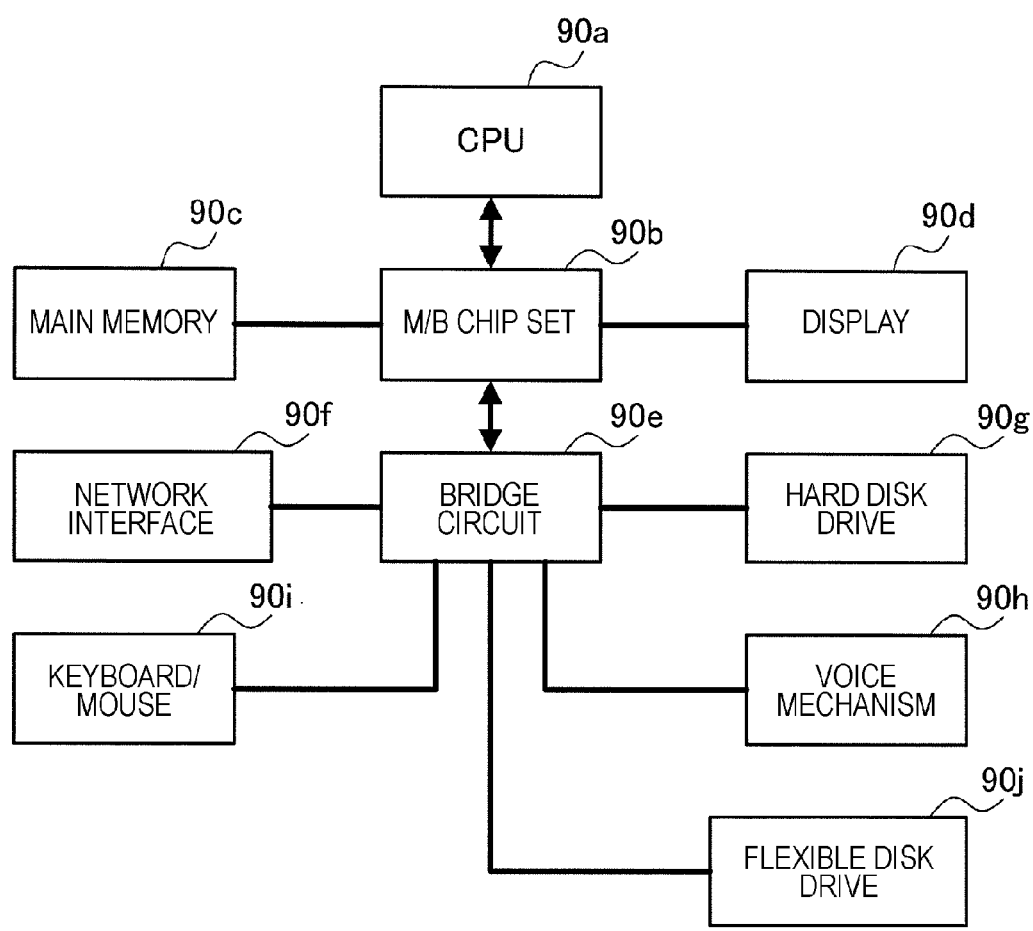
FIG. 15 is a diagram showing a hardware configuration of a computer to which an embodiment of the present invention is applicable.

Lastly, a hardware configuration of a computer to which an embodiment is suitably applied will be described. FIG. 15 is a diagram showing an example of a hardware configuration of such a computer. As shown, the computer includes a central processing unit (CPU) 90a as a calculation means, a main memory 90c coupled to the CPU 90a via an M/B (motherboard) chip set 90b, and a display 90d coupled to the CPU 90a via the M/B chip set 90b. Coupled to the M/B chip set 90*b* via a bridge circuit 90*e* are a network interface 90*f*, a hard disk drive (HDD) 90*g*, a voice mechanism 90*h*, a keyboard/mouse 90*i*, and a flexible disk drive 90*j*.

These components are coupled to one another via buses in FIG. 15. For example, the CPU 90*a* and M/B chip set 90*b* are coupled via a CPU bus, and the M/B chip set 90*b* and main memory 90*c* are also coupled via the CPU bus. The M/B chip set 90*b* and display 90*d* may be coupled via an accelerated graphics port (AGP). If the display 90*d* includes a PCI Express-compliant video card, the M/B chip set 90*b* and this video card are coupled via a PCI Express (PCIe) bus. The network interface 90*f* is coupled to the bridge circuit 90*e* via, for example, PCI Express. The hard disk drive 90*g* is coupled to the bridge circuit 90*e* via, for example, serial AT attachment (ATA), parallel transfer ATA, or peripheral components interconnect (PCI). The keyboard/mouse 90*i* and flexible disk drive 90*j* are coupled to the bridge circuit 90*e* via universal serial buses (USB).

The present invention in its entirety may be realized using hardware or realized using software. Or the present invention may be realized using both hardware and software. Further, the present invention may be realized as any of a computer, a data processing system, and a computer program. Such a computer program may be stored in a computer-readable medium and provided. Among such computer-readable media are electronic media, magnetic media, optical media, electromagnetic media, infrared or semiconductor systems (devices). More specifically, computer-readable media include semiconductors or solid state storage devices, magnetic tapes, detachable computer diskettes, random access memories (RAMs), read-only memories (ROMs), rigid magnetic disks, and optical disks. Among currently available optical disks are compact disc-read only memories (CD-ROMs), compact disc-read/write (CD-R/W), and digital versatile discs (DVDs).

While the present invention has been described using various embodiment thereof, the technical scope of the invention is not limited to the above-described embodiments. It will be apparent for those skilled in the art that various modifications can be made thereto or substitutes can be used without departing from the spirit and scope of the invention.

The invention claimed is:

1. An apparatus for helping in a reading of an electronic message exchanged between multiple users within a chat room or instant message utility, the apparatus comprising:
    a plurality of computing units in communication with one another, each of the plurality of computing units configured to perform a portion of a process including:
        extracting a word from the electronic message sent to a particular user;
        acquiring history information on a viewing of the word by the particular user, the word being extracted by an extraction unit of the plurality of computing units; and
        determining whether a meaning of the word extracted by the extraction unit needs to be presented to the particular user, according to the history information acquired by an acquisition unit of the plurality of computing units, wherein the determining is based on a criteria related to the viewing of the word by the particular user, and wherein the determining is performed by a determination unit of the plurality of computing units.

2. The apparatus according to claim 1, wherein
the acquisition unit acquires the history information on the viewing of the word, and
if the history information on the viewing of the word meets a criterion that is related to the viewing of the word and predetermined as a criterion for presuming that the particular user knows the meaning of the word, the determination unit determines that the meaning of the word need not be presented to the particular user.

3. The apparatus according to claim 1, wherein
the acquisition unit acquires the history information on the viewing of the word, and
if the history information on the viewing of the word does not meet a criterion that is related to the viewing of the word and predetermined as a criterion for presuming that the particular user knows the meaning of the word, the determination unit determines that the meaning of the word needs to be presented to the particular user.

4. The apparatus according to claim 1, wherein
the acquisition unit acquires the history information on the viewing of the word and the history information on usage of the word, and
even if the history information on the viewing of the word does not meet a criterion that is related to the viewing of the word and predetermined as a criterion for presuming that the particular user knows the meaning of the word, the determination unit determines that the meaning of the word need not be presented to the particular user if the history information on the usage of the word meets a criterion that is related to the usage of the word and predetermined as a criterion for presuming that the particular user knows the meaning of the word.

5. The apparatus according to claim 4, wherein
the acquisition unit acquires the history information on the viewing of the word and the history information on the usage of the word, and
if the history information on the viewing of the word does not meet a criterion that is related to the viewing of the word and predetermined as a criterion for presuming that the particular user knows the meaning of the word and if the history information on the usage of the word does not meet a criterion that is related to the usage of the word and predetermined as a criterion for presuming that the particular user knows the meaning of the word, the determination unit determines that the meaning of the word needs to be presented to the particular user.

6. The apparatus according to claim 4, wherein
the acquisition unit acquires the history information on the usage of the word, and
if the history information on the usage of the word meets a criterion that is related to the usage of the word and predetermined as a criterion for presuming that the particular user knows the meaning of the word, the determination unit determines that the meaning of the word need not be presented to the particular user.

7. The apparatus according to claim 4, wherein
the acquisition unit acquires the history information on the usage of the word, and
if the history information on the usage of the word does not meet a criterion that is related to the usage of the word and predetermined as a criterion for presuming that the particular user knows the meaning of the word, the determination unit determines that the meaning of the word needs to be presented to the particular user.

8. The apparatus according to claim 4, wherein
the acquisition unit acquires the history information on the usage of the word and the history information on a consultation of an electronic dictionary by the particular user for examining the meaning of the word, and if the history information on the usage of the word does not meet a criterion that is related to the usage of the word and predetermined as a criterion for presuming that the particular user knows the meaning of the word and if the history information on the consultation does not meet a criterion that is related to the consultation of the electronic dictionary and predetermined as a criterion for presuming that the particular user knows the meaning of the word, the determination unit determines that the meaning of the word needs to be presented to the particular user.

9. The apparatus according to claim 8, wherein even if the history information on the usage of the word does not meet a criterion that is related to the usage of the word and predetermined as a criterion for presuming that the particular user knows the meaning of the word, the determination unit determines that the meaning of the word need not be presented to the particular user if the history information on the consultation of the electronic dictionary meets a criterion that is related to the consultation of the electronic dictionary and predetermined as a criterion for presuming that the particular user knows the meaning of the word.

10. A method for helping in a reading of an electronic message exchanged between multiple users, the method comprising the steps of:
a chat room or instant message utility sending an electronic message between users;
extracting a word from the electronic message sent to a particular user;
acquiring history information on viewing and usage of the extracted word by the particular user; and
determining whether a meaning of the extracted word needs to be presented to the particular user, according to the acquired history information, wherein the determining is based on a criteria related to the viewing of the word by the particular user.

11. The method according to claim 10, wherein
the acquiring step acquires the history information on the viewing of the word, and
if the history information on the viewing of the word meets a criterion that is related to the viewing of the word and predetermined as a criterion for presuming that the particular user knows the meaning of the word, the determining step determines that the meaning of the word need not be presented to the particular user.

12. The method according to claim 10, wherein
the acquiring step acquires the history information on the viewing of the word, and
if the history information on the viewing of the word does not meet a criterion that is related to the viewing of the word and predetermined as a criterion for presuming that the particular user knows the meaning of the word, the determining step determines that the meaning of the word needs to be presented to the particular user.

13. The method according to claim 10, wherein
the acquiring step acquires the history information on the viewing of the word and the history information on the usage of the word, and
even if the history information on the viewing of the word does not meet a criterion that is related to the viewing of the word and predetermined as a criterion for presuming that the particular user knows the meaning of the word, the determining step determines that the meaning of the word need not be presented to the particular user if the history information on the usage of the word meets a criterion that is related to the usage of the word and predetermined as a criterion for presuming that the particular user knows the meaning of the word.

14. The method according to claim 10, wherein
the acquiring step acquires the history information on the viewing of the word and the history information on the usage of the word, and
if the history information on the viewing of the word does not meet a criterion that is related to the viewing of the word and predetermined as a criterion for presuming that the particular user knows the meaning of the word and if the history information on the usage of the word does not meet a criterion that is related to the usage of the word and predetermined as a criterion for presuming that the particular user knows the meaning of the word, the determining step determines that the meaning of the word needs to be presented to the particular user.

15. The method according to claim 10, wherein
the acquiring step acquires the history information on the usage of the word, and
if the history information on the usage of the word meets a criterion that is related to the usage of the word and predetermined as a criterion for presuming that the particular user knows the meaning of the word, the determining step determines that the meaning of the word need not be presented to the particular user.

16. The method according to claim 10, wherein
the acquiring step acquires the history information on the usage of the word, and
if the history information on the usage of the word does not meet a criterion that is related to the usage of the word and predetermined as a criterion for presuming that the particular user knows the meaning of the word, the determining step determines that the meaning of the word needs to be presented to the particular user.

17. The method according to claim 10, wherein
the acquiring step acquires the history information on the usage of the word and the history information on a consultation of an electronic dictionary by the particular user for examining the meaning of the word, and
if the history information on the usage of the word does not meet a criterion that is related to the usage of the word and predetermined as a criterion for presuming that the particular user knows the meaning of the word and if the history information on the consultation does not meet a criterion that is related to the consultation of the electronic dictionary and predetermined as a criterion for presuming that the particular user knows the meaning of the word, the determining step determines that the meaning of the word needs to be presented to the particular user.

18. The method according to claim 17, wherein even if the history information on the usage of the word does not meet a criterion that is related to the usage of the word and predetermined as a criterion for presuming that the particular user knows the meaning of the word, the determining step determines that the meaning of the word need not be presented to the particular user if the history information on the consultation of the electronic dictionary meets a criterion that is related to the consultation of the electronic dictionary and predetermined as a criterion for presuming that the particular user knows the meaning of the word.

19. A program product stored on a non-transitory computer-readable storage medium which when executed by a computer, causes the computer to help in a reading of an electronic message exchanged between multiple users, the program product comprising:
- a chat room or instant message utility sending an electronic message between users;
- an extraction unit for extracting a word from the electronic message sent to a particular user;
- an acquisition unit for acquiring history information on viewing and usage of the word by the particular user, the word being extracted by the extraction unit; and
- a determination unit for determining whether a meaning of the word extracted by the extraction unit needs to be presented to the particular user, according to the history information acquired by the acquisition unit, wherein the determining is based on a criteria related to the viewing of the word by the particular user.

* * * * *